F. L. WHITE.
ELECTRIC BATTERY.
APPLICATION FILED MAR. 29, 1912.
1,048,773.
Patented Dec. 31, 1912.
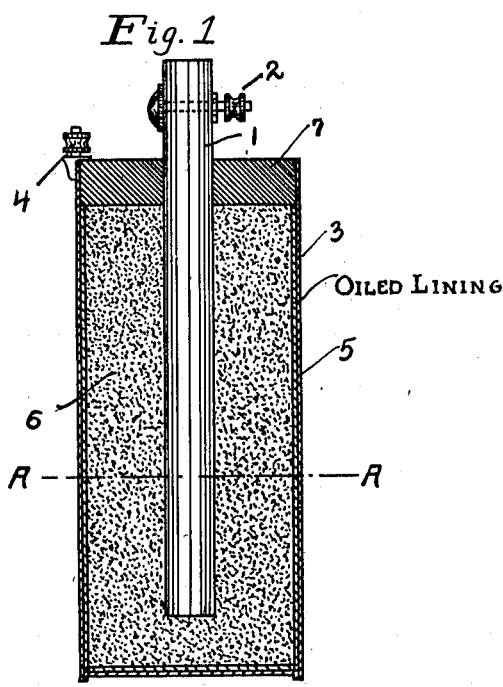
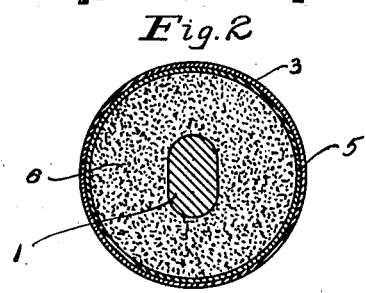
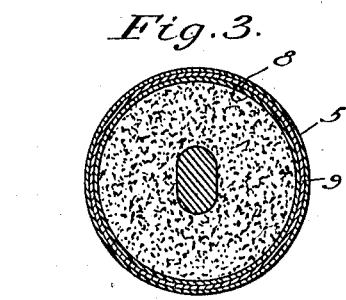
WITNESSES
INVENTOR
FREDERICK L. WHITE
BY Ira J. Adams,
ATTORNEY

UNITED STATES PATENT OFFICE.

FREDERICK L. WHITE, OF LAKEWOOD, OHIO, ASSIGNOR TO NATIONAL CARBON CO., OF CLEVELAND, OHIO, A CORPORATION OF NEW JERSEY.

ELECTRIC BATTERY.

1,048,773.  Specification of Letters Patent.  Patented Dec. 31, 1912.

Application filed March 29, 1912. Serial No. 687,247.

*To all whom it may concern:*

Be it known that I, FREDERICK L. WHITE, a resident of Lakewood, in the county of Cuyahoga, in the State of Ohio, have invented new and useful Improvements in Electric Batteries, of which the following is a clear and exact description.

My invention relates to an improvement in that type of galvanic cells commonly known as dry cells. In this type of cells a battery mix in a dry or semi-dry condition is packed around an electrode, the whole being contained in a metal cup having a bibulous lining. The electrode is usually made of carbon and the cup of zinc.

The object of my invention is to prevent the deterioration of these cells during their "shelf life", or during the period in which they are being shipped or are in the hands of jobbers, dealers or users, before being put into active service.

Another object is to prevent the deterioration during long periods of inactivity after being placed in use.

Other objects and advantages will appear in the following description, particular reference being had to the accompanying drawings in which:

Figure 1 is a vertical cross-sectional view of a dry battery to which my invention may be applied. Fig. 2 is a horizontal sectional view of the same cell taken on the line A—A of Fig. 1. Fig. 3 is a cross section of a modified form.

Referring to said figures, 1 is a negative electrode preferably made of carbon, and provided with a binding post 2 fastened thereto which constitutes one of the terminals of the battery. The container 3, in this instance made of zinc, constitutes the positive electrode. To this zinc container another binding post 4 is attached to provide the second terminal of the battery. Within the zinc container 3 is a bibulous or porous lining 5 consisting of one or more layers of paper or other material. This lining 5 tends to prevent the battery mix 6, which is packed in the lined container, from coming into contact with the zinc container, and also serves as a reservoir for the electrolyte. The mix may be of any of the well known compositions. The cell is sealed in the usual manner by a covering 7 which prevents any deterioration from the action of the atmosphere and external sources, and also makes the cell impervious to water.

After a dry cell has been standing for as short a time as one or two months, tests will show that the short circuit current of the cell has decreased and a general deterioration soon follows. After a certain time the cell may become practically useless from merely standing on the shelves awaiting sale and without any use whatever. This is in part due to the drying out of the electrolyte thereby causing a crystalline deposit to be made on the inside of the metallic electrode which greatly increases the internal resistance and causes the cell to deteriorate; and in part due to local action between the zinc or other metal electrode and the mix, whereby the electrode is eaten away. To prevent this fault during the unavoidable period in which a cell is not in use is the purpose of my invention, and the way in which the result is accomplished is as follows.

The bibulous lining 5 is first dampened by any means, such as by soaking in water, or in the electrolyte solution, and afterward part of the fluid may be pressed out. Kerosene is then applied to one side of the lining by any means such as a brush. The oiled lining is then put in the zinc container preferably with the oiled side next to the zinc cup though this is not absolutely essential. The mix may then be packed inside the lining in the usual way. The oil may be applied to the lining by dipping it in the kerosene instead of applying it with a brush, as the manner in which the oil is applied is immaterial. The function of the water or other solution is to prevent the lining from absorbing so much oil as to increase the internal resistance to an objectionable point.

Experiment has shown that many kinds and grades of oils may be used, such as kerosene, engine oil and other lubricating oils, linseed oil, vaseline, greases and hard oils. Another method consists in applying the kerosene or other oil to the inside of the zinc cup and then inserting the lining. The type of lining is, of course, immaterial so long as it is absorbent.

Dry cells are sometimes made by putting the filling or mix in a cloth bag 8 (Fig. 3) and placing the same in the zinc container 5. The space between the container and bag is filled with a flour paste as at 9. My invention may be applied to this cell by smearing the oil on the bag or on the zinc container, or a paste consisting of flour and oil may be used instead of the customary flour paste.

The oil will penetrate through the thin coating of paste to the zinc and the action will be the same as if the oil were placed directly on the zinc. It will be understood, of course, that this method of applying the oil is alternative. The oil may be applied directly to the zinc if desired.

An emulsion of zinc chlorid ($ZnCl_2$) and oil or a mixture of various pastes and oils may be made and used in any of the arrangements instead of the oil alone.

The use of oil as described has been found to prevent practically spontaneous deterioration and thereby increases the shelf life. No evil effects are caused by the use of the oil. The initial E. M. F. is as high as usual and the initial short circuit current likewise is not appreciably diminished.

Further advantages of the invention will be evident from what has been previously set forth and these need not be specifically referred to.

It is obvious that my invention is not limited to carbon-zinc dry cells, nor to dry cells in general. It may be used with any type of electric battery to accomplish its function, namely, to prevent deterioration by local action or formation of a coating having a high resistance.

I am aware that various schemes have been devised to prevent spontaneous deterioration, such as packing a dry mix in the cell with the idea that a liquid is to be poured in by the user when the cell is to be used. Cells have also been lined with a wax to prevent electrolytic action, but this type has to be warmed to cause the wax to melt and rise to the top before the cell can be used and if the cell is used on intermittent work the wax can no longer prevent the deterioration of the cell. A cell made in accordance with my invention, in distinction from these, is always ready for use and spontaneous deterioration is prevented throughout the whole life of the cell. The user does not have to add any fluid or treat it in any way except to connect it up in the usual way.

Having described my invention what I claim is:

1. In a dry cell, a negative electrode, a positive electrode, a battery mix, a coating of oil on said positive electrode and means between the mix and the positive electrode to retain the oil and prevent it from rising to the top of the cell.

2. In a dry cell, the combination of a positive electrode, a negative electrode, a battery mix and an oiled lining between one electrode and the mix.

3. In a dry cell, the combination of a positive electrode, a negative electrode, a battery mix and an oiled lining between the positive electrode and the mix.

4. In a dry cell, the combination of a positive electrode, a negative electrode, a battery mix and a filling containing an oil between the mix and the positive electrode.

5. In a dry battery, a negative electrode, a positive electrode, a battery mix and a lining containing kerosene between the mix and the positive electrode.

In testimony whereof I have hereunto signed my name.

FREDERICK L. WHITE.

In presence of—
   F. D. LAWRENCE,
   W. B. PRETZ.